(12) United States Patent
Takahashi

(10) Patent No.: US 10,984,523 B2
(45) Date of Patent: Apr. 20, 2021

(54) SEAM INSPECTION APPARATUS

(71) Applicant: FANUC Corporation, Yamanashi (JP)

(72) Inventor: Kenji Takahashi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 8 days.

(21) Appl. No.: 16/423,156

(22) Filed: May 28, 2019

(65) Prior Publication Data

US 2019/0378266 A1 Dec. 12, 2019

(30) Foreign Application Priority Data

Jun. 11, 2018 (JP) .............................. JP2018-111251

(51) Int. Cl.
*G06T 7/00* (2017.01)
*D06H 3/08* (2006.01)
*G06K 9/46* (2006.01)
*G01N 21/956* (2006.01)

(52) U.S. Cl.
CPC ............ *G06T 7/0006* (2013.01); *D06H 3/08* (2013.01); *G01N 21/95607* (2013.01); *G06K 9/4604* (2013.01); *D06H 2201/10* (2013.01); *G06T 2207/30124* (2013.01)

(58) Field of Classification Search
None
See application file for complete search history.

(56) References Cited

U.S. PATENT DOCUMENTS

| 3,536,409 A | 10/1970 | Belser et al. |
| 5,125,034 A | 6/1992 | Hudson et al. |
| 2009/0195649 A1* | 8/2009 | Gylling ................. G06T 7/0004 348/125 |
| 2010/0186646 A1* | 7/2010 | Stokes ................... D05B 19/12 112/470.05 |
| 2018/0089818 A1 | 3/2018 | Kobayashi |
| 2019/0284750 A1 | 9/2019 | Fujie et al. |

FOREIGN PATENT DOCUMENTS

| JP | H716376 A | 1/1995 |
| JP | H10170231 A | 6/1998 |
| JP | H1190077 A | 4/1999 |
| JP | 2000318060 A | 11/2000 |
| JP | 2017211259 A | 11/2017 |
| JP | 201854375 A | 4/2018 |
| JP | 2019154936 A | 9/2019 |

* cited by examiner

*Primary Examiner* — Leon Flores
(74) *Attorney, Agent, or Firm* — Hauptman Ham, LLP

(57) ABSTRACT

A seam inspection apparatus can automatically determine the quality of an image of a seam of a sewn product. The seam inspection apparatus includes an image data acquisition unit that acquires image data of a seam of a sewn product, a feature extraction unit that extracts a feature quantity of the seam from the image data of the seam of the sewn product acquired by the image data acquisition unit, and a quality determination unit that performs quality determination of the seam based on the feature quantity of the seam.

15 Claims, 4 Drawing Sheets

FOR EXAMPLE, USE IMAGE CONTAINING
THREE SEAMS AS INPUT DATA FOR
MACHINE LEARNING DEVICE

IDEAL SEAM

EXAMPLE 1 OF DEFECTIVE SEAM

EXAMPLE 2 OF DEFECTIVE SEAM

EXAMPLE 3 OF DEFECTIVE SEAM

SEAM INSPECTION APPARATUS

RELATED APPLICATION

The present application claims priority to Japanese Application Number 2018-111251 filed Jun. 11, 2018, the disclosure of which is hereby incorporated by reference herein in its entirety.

BACKGROUND OF THE INVENTION

1. Field of the Invention

The present invention relates to a seam inspection apparatus.

2. Description of the Related Art

Goods processed in a factory include sewn products in which cloth-like workpieces are processed by sewing, such as a cover part of a car seat and a bag, for example. In some sewn products, a seam part forms a part of the surface design. For such sewn products, a worker has visually inspected the sewn products one by one whether or not a seam part involves distortion or variation in the length, angle, or the like of the seam.

Since inspection of seams of a sewn product is performed visually by a worker as described above, inspection relies upon the worker's skill, the worker's sense, the physical condition of the worker on the inspection day, and the like. This causes a problem that it is difficult to maintain the inspection level and the inspection time at a certain level. Further, in order to secure workers having a certain level of proficiency, cost is required to train the workers for visual inspection of seams.

SUMMARY OF THE INVENTION

It is therefore an object of the present invention to provide a seam inspection apparatus capable of automatically determining the quality of a seam image of a sewn product.

A seam inspection apparatus of the present invention performs image processing on image data of a sewn product captured by an imaging unit such as a camera to detect a seam of the sewn product, and for the detected seam, quantizes the length, angle, or the like thereof as a feature quantity, and determines the quality of the seam of the sewn product by means of determining whether or not the feature quantity is within a certain numerical value.

Further, a seam inspection apparatus of another embodiment of the present invention uses a means of machine learning, and performs quality determination of a seam of a sewn product based on an image of the seam of the sewn product.

One aspect of the present invention is a seam inspection apparatus that determines quality of a seam of a sewn product. The apparatus includes an image data acquisition unit that acquires image data of the seam of the sewn product, a feature extraction unit that extracts a feature quantity of the seam from the image data of the seam of the sewn product acquired by the image data acquisition unit, and a quality determination unit that performs quality determination of the seam based on the feature quantity of the seam. The quality determination unit performs the quality determination of the seam based on at least one of a length and an angle in the feature quantity of the seam.

Another aspect of the present invention is a seam inspection apparatus that determines quality of a seam of a sewn product. The apparatus includes an image data acquisition unit that acquires image data of the seam of the sewn product, a feature extraction unit that extracts a feature quantity of the seam from the image data of the seam of the sewn product acquired by the image data acquisition unit, and a quality determination unit that performs quality determination of the seam based on the feature quantity of the seam. The quality determination unit is configured as a machine learning device in which supervised learning is performed by using a feature quantity of the seam of the sewn products and a quality result that is determined in advance for the sewn product as teacher data.

According to the present invention, it is possible to manage visual inspection of seams that has been relied on the sense of a worker conventionally, by using quantization. Moreover, labor saving can also be expected.

BRIEF DESCRIPTION OF THE DRAWINGS

Aforementioned and other objects and features of the present invention will become apparent from the following description of embodiments thereof with reference to the accompanying drawings. In the drawings.

DETAILED DESCRIPTION OF THE PREFERRED EMBODIMENTS

Hereinafter, an embodiment of the present invention will be described in conjunction with the drawings.

Figure 1:
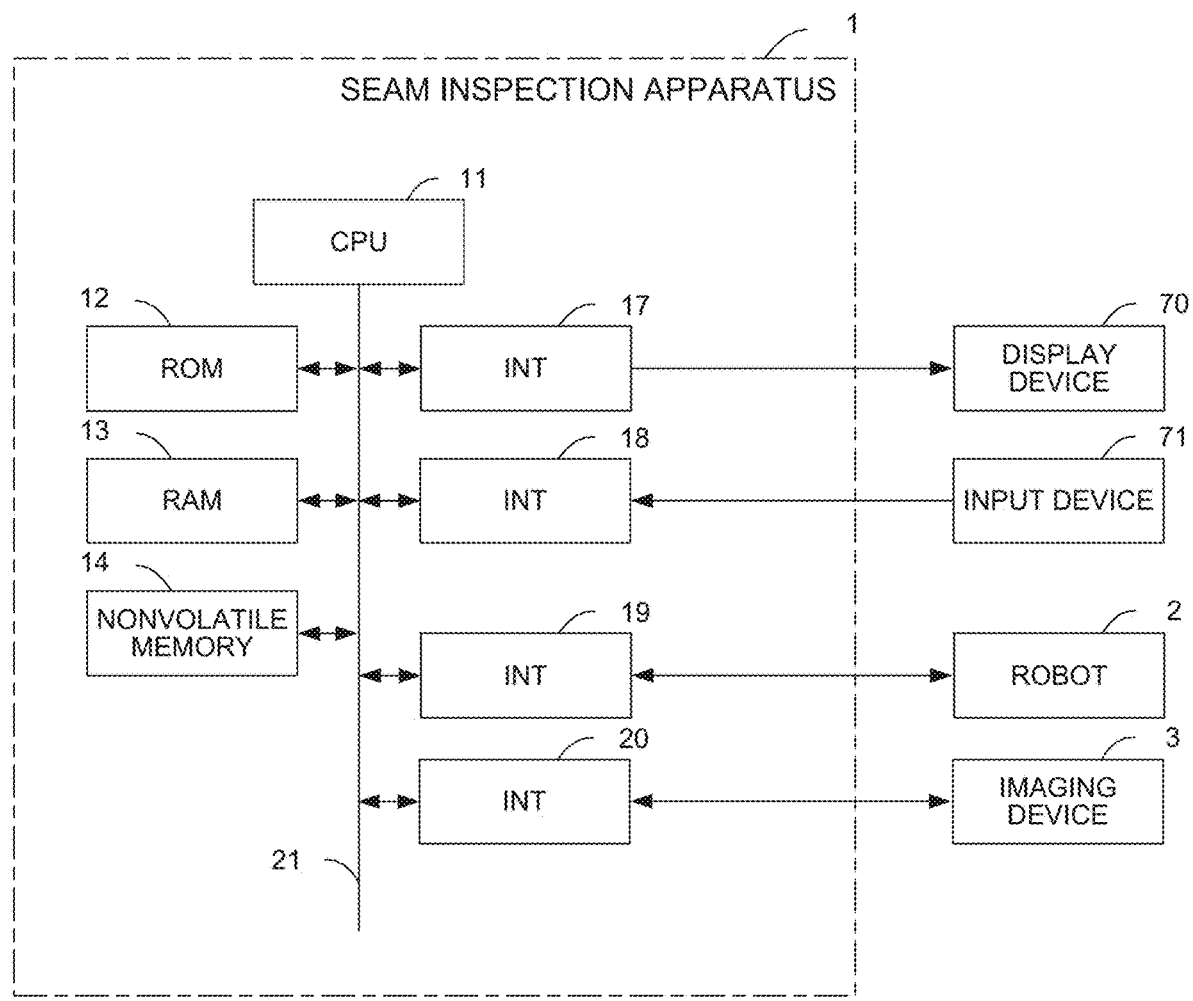
FIG. 1 is a schematic hardware configuration diagram of a seam inspection apparatus according to an embodiment.

FIG. 1 is a schematic hardware configuration diagram illustrating a main part of a seam inspection apparatus according to an embodiment of the present invention. A seam inspection apparatus 1 of the present embodiment can be implemented as a personal computer provided together with a manufacturing machine such as a sewing machine or the like installed in a factory, or a computer such as a cell computer, a host computer, an edge server, a cloud server, or the like to be used for management of operation and the like of a manufacturing machine installed in a factory. FIG. 1 illustrates an example of the case where the seam inspection apparatus 1 is installed as a computer provided together with a manufacturing machine installed in a factory.

A CPU 11 provided to the seam inspection apparatus 1 of the present embodiment is a processor that controls the seam inspection apparatus 1 as a whole. The CPU 11 reads a system program stored in a ROM 12 via a bus 21, and controls the entire seam inspection apparatus 1 in accordance with the system program. A RAM 13 temporarily stores temporary calculation data and display data, various types of data input by an operator via an input unit not illustrated, and the like.

A nonvolatile memory 14 is configured as a memory in which a storing state is maintained even if the power supply of the seam inspection apparatus 1 is turned off, by using an SRAM, an SSD, or the like backed up by a battery not illustrated. The nonvolatile memory 14 stores data and program input via an input device 71, data acquired from a robot 2 via an interface 19, data acquired from an imaging device 3 via an interface 20, and the like. The data, programs, and the like stored in the nonvolatile memory 14 may be developed on the RAM 13 for use. In a ROM 12, various algorithms required for image analysis of image data acquired from the imaging device 3 and a system program for performing other required processes are written beforehand.

On a display device 70, various types of data read on the memory, data obtained as a result of execution of a program or the like, and the like are output via an interface 17 and are displayed. An input device 71 configured of a keyboard, a pointing device, and the like receives a command based on operation by an operator, data, and the like, and transfers them to the CPU 11.

The imaging device 3 has a function of capturing an image of a capturing target like a camera and outputting it as image data. Imaging operation by the imaging device 3 is performed by an imaging command output via the interface 20 by execution of an imaging control code included in an inspection program by the CPU 11. Image data obtained by the imaging operation is transferred to the CPU 11 via the interface 20.

A robot 2 may be an articulated robot in which the imaging device 3 is provided to the distal end thereof, or may be an orthogonal robot in which a drive unit, to which the imaging device 3 is provided, can be moved to the position of a sewn product to be imaged, or the like. Operation of the robot 2 is controlled by a control command that is output via the interface 19 by execution of a robot control code included in the inspection program by the CPU 11.

Figure 2:
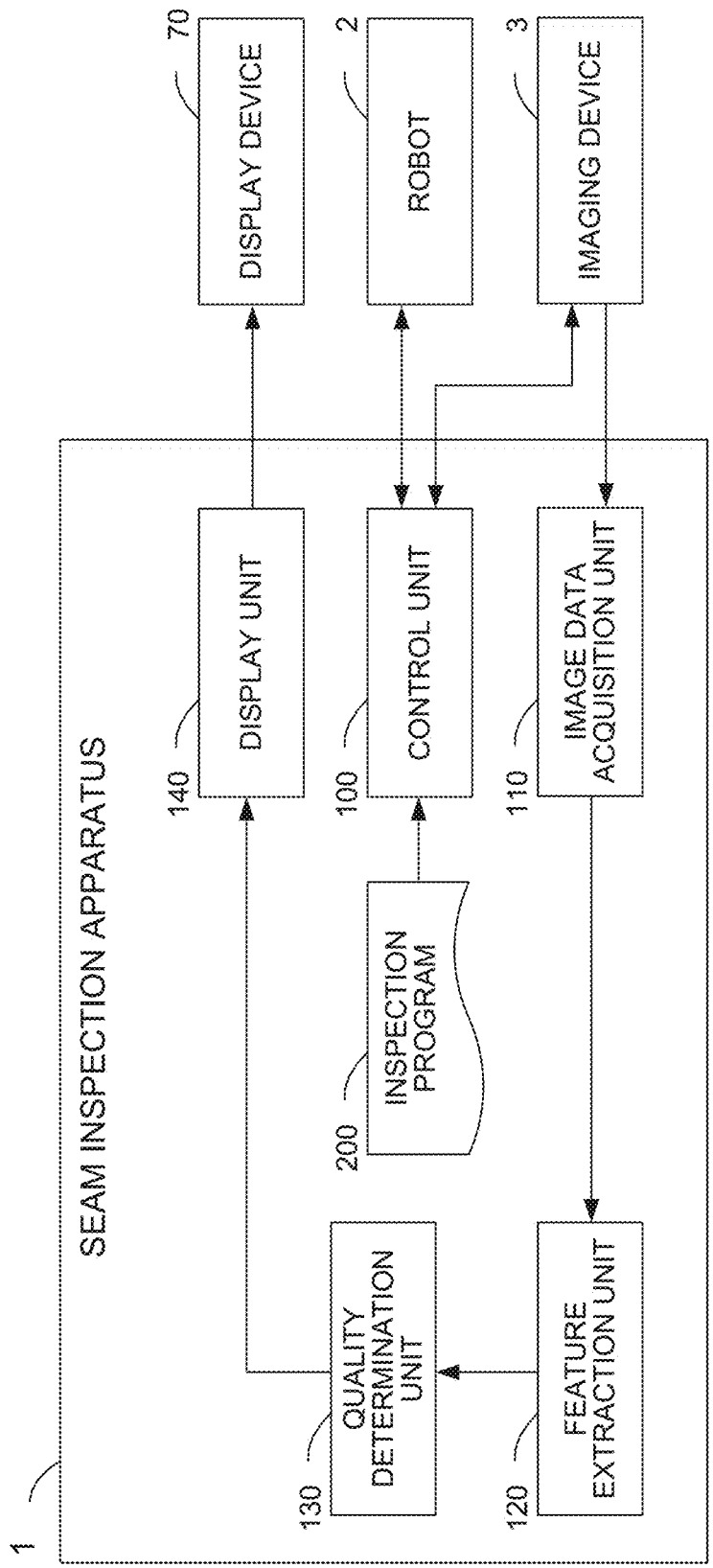
FIG. 2 is a schematic functional block diagram of a seam inspection apparatus according to an embodiment.

FIG. 2 is a schematic functional block diagram of the seam inspection apparatus 1 according to an embodiment of the present invention. Each functional block illustrated in FIG. 2 is implemented such that the CPU 11 provided to the seam inspection apparatus 1 illustrated in FIG. 1 executes the system program to control operation of each unit of the seam inspection apparatus 1.

The seam inspection apparatus 1 of the present embodiment includes a control unit 100, an image data acquisition unit 110, a feature extraction unit 120, a quality determination unit 130, and a display unit 140.

The control unit 100 controls the robot 2 and the imaging device 3 based on an inspection program 200 stored in the nonvolatile memory 14 to image a sewn product to be inspected. The control unit 100 drives each drive unit of the robot 2 such that the imaging device 3 mounted on the robot 2 comes to a position where it can image an imaging portion of a sewn product to be inspected. When the imaging device 3 comes to the position where it can image the imaging portion of the sewn product, the control unit 100 commands the imaging device 3 of setting of the imaging conditions (setting of exposure, focus, magnification, and the like) and imaging operation. The control unit 100 may control the robot 2 and the imaging device 3 so as to image a plurality of imaging portions of one sewn product in accordance with the inspection program 200. Note that the control unit 100 is not an essential element for the seam inspection apparatus 1. For example, in the case where image data of a sewn product, captured by an image capturing device or the like, is acquired via an external storage device or a network not illustrated, and a seam is inspected by using the acquired image data of the sewn product, the seam inspection apparatus 1 itself does not need to have the control unit 100.

The image data acquisition unit 110 acquires image data of a sewn product captured by the imaging device 3. Image data to be acquired by the image data acquisition unit 110 may be managed collectively by putting a plurality of pieces of image data obtained by imaging one sewn product in a set of image data group.

The feature extraction unit 120 performs publicly-known image processing on the image data acquired by the image data acquisition unit 110, and extracts a feature quantity of a seam from an image of a sewn product. The feature extraction unit 120 may specify a seam part from an image of a sewn product by performing publicly-known image processing such as noise removal, edge extraction, pattern matching using previously created seam patterns, for example, and extract the feature quantity of the seam from the image of the specified seam part. The feature extraction unit 120 may, for a seam portion specified from an image of a sewn product, group a series of seams (a series of seams aligned continuously in the same direction, a series of seams gathered in a predetermined area, and the like) as a set of seams, and then extract the feature quantity of the seams included in the set. The feature quantity of the seams to be extracted by the feature extraction unit 120 may be the number of seams, the length of each seam, or an angle against a predetermined reference axis, for example. Further, as the feature quantity of the seam to be extracted by the feature extraction unit 120, the width, area, color, presence/absence of a fray, or the like of each seam may be extracted as a feature quantity.

Figure 3:
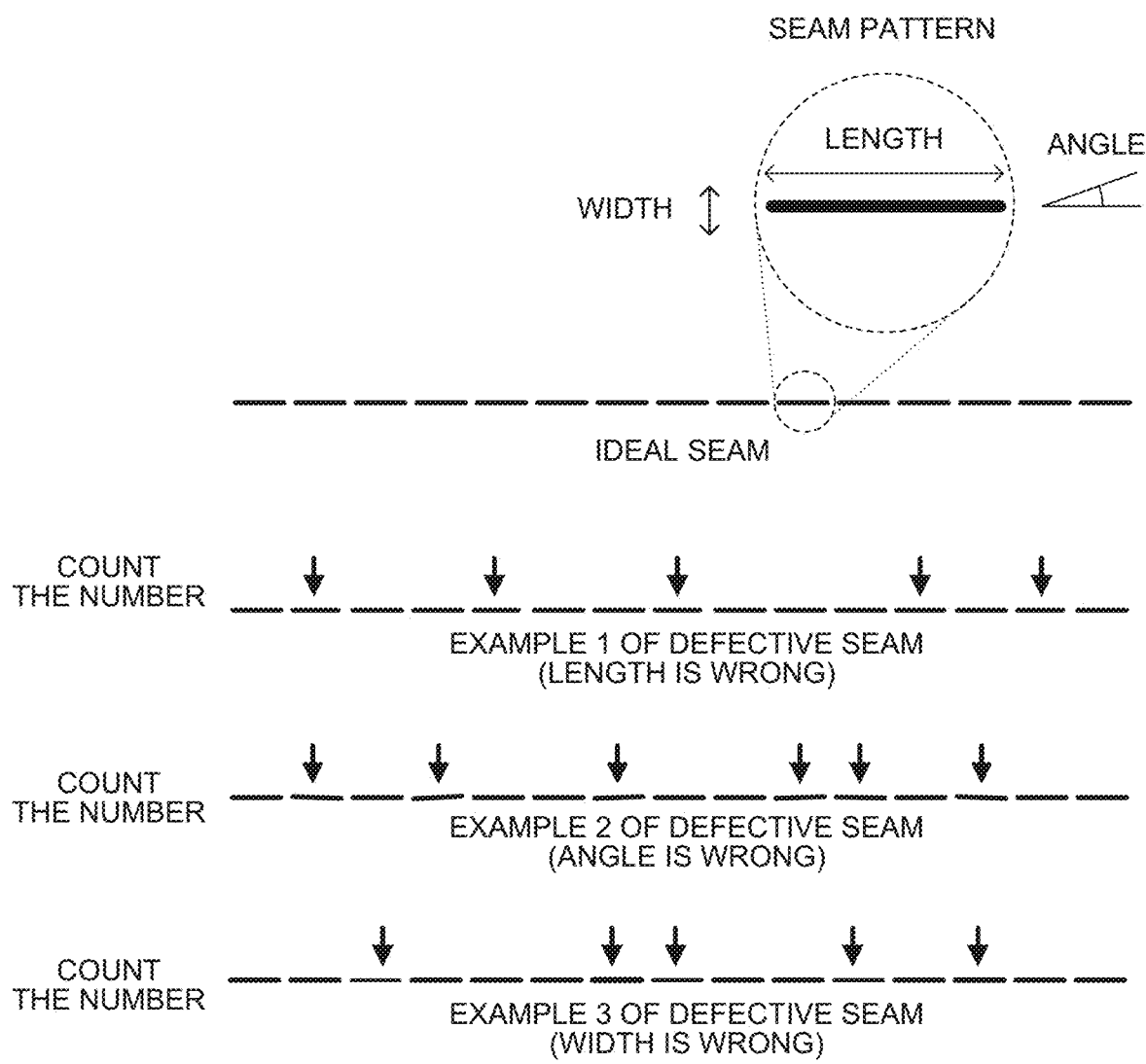
FIG. 3 is a diagram for explaining quality determination of a seam.

The quality determination unit 130 determines the quality of a seam of a sewn product based on the feature quantity of the seam extracted by the feature extraction unit 120. As illustrated in FIG. 3, regarding the feature quantities of the seams extracted by the feature extraction unit 120, the quality determination unit 130 may determine that the sewn product is a defective product when the number of seams out of a predetermined allowable range of a certain length is equal to or larger than a predetermined threshold, for example. As illustrated in FIG. 3, regarding the feature quantities of the seams extracted by the feature extraction unit 120, the quality determination unit 130 may determine that the sewn product is a defective product when the number of seams out of a predetermined allowable range of a certain angle is equal to or larger than a predetermined threshold, for example. On the contrary, the quality determination unit 130 may determine that the sewn product is a conforming product when the number of seams in which the length or the angle is within the allowable range is equal to or a larger than a predetermined threshold, for example. Moreover, the quality determination unit 130 may determine the quality by using a ratio or the like of the seams that are out of the allowable range in a set of seams. The quality determination unit 130 may perform the above-described determination on a feature quantity other than the length or angle of the seams, or may determine the quality of the seams based on a combination of these feature quantities. Generally, good appearance of a seam can be maintained by using at least an angle or a length. However, by using both the length and the angle for quality determination, or by performing quality determination with a further combination with another feature quantity, it is possible to determine only a sewn product having a seam of better appearance as a conforming product.

The quality determination unit 130 may, for a set of seams, determine the quality of the seams based on variation of the feature quantities of the seams. The quality of the seams may be determined based on whether or not the seams have unity in a first glance. Therefore, it is sufficiently meaningful to determine that a sewn product is a defective product when a variance value of the feature quantity such as a length or an angle, for example, is out of a predetermined threshold.

On the other hand, as for a feature quantity such as fray of a seam, the appearance may be bad if there is even one. Therefore, it is effective to determine the quality based on the number thereof.

For a series of seams, the quality determination unit 130 may determine the quality of the seams based on a difference in feature quantity between adjacent seams. The difference in feature quantity between adjacent seams has larger impact on the appearance, compared with a difference in feature quantity between seams located away from each other. Therefore, a sewn product may be determined to be a defective product when the number of seam sets in which a difference between adjacent seams is equal to or larger than a predetermined threshold.

The display unit displays, on a display device 70, a determination result of seam quality of a corrected product determined by the quality determination unit 130. Based on the determination result of the quality determination unit 130, the display unit 140 may display the quality determination of the seam of the sewn product, or specifically shows a seam in which a feature quantity is deviated from the standard (as illustrated in FIG. 3).

As a modification of the seam inspection apparatus 1, the quality determination unit 130 may be configured as a publicly-known machine learning device. When a machine learning device is used, in the case of a simple configuration, for example, the quality determination unit 130 is configured as a machine learning device that performs supervised learning, and for an image of a seam of a sewn product, supervised learning is performed by using the feature quantity of the image of the seam by the feature extraction unit 120 and the determination result of the seam quality of the sewn product by a skilled worker as teacher data. Then, based on the result of the supervised learning, the quality determination unit 130 determines the quality of the seam for the image of the seam of the sewn product acquired by the image data acquisition unit 110.

In the case of configuring the quality determination unit 130 as a machine learning device for performing supervised learning, the feature extraction unit 120 may extract a feature quantity such as a length or an angle as a feature quantity of a seam of a sewn product. Meanwhile, the feature extraction unit 120 may extract an image itself of a seam specified from an image of a sewn product, as a feature quantity. In that case, the feature extraction unit 120 may extract a seam image including a predetermined number of seams among a series of continuous seams, as a feature quantity.

Figure 4:
FIG. 4 is a diagram for explaining input data when the quality of a seam is determined by a machine learning device.

In the case of using a machine learning device as the quality determination unit 130, when the quality of the seams is determined using the entire image of a series of seams, it is difficult to understand which seam has a problem. However, as illustrated in FIG. 4, by using an image each including one or more small number of (three, for example) seams from the entire image of a series of seams as input data for the machine learning device, for example, it is possible to specify the part that is the cause of the determination that the product is defective. As the machine learning device constituting the quality determination unit 130, a multi-layer neural network can be used, for example.

While the embodiments of the present invention have been described above, the present invention is not limited only to the examples of the embodiments, and can be implemented in various aspects by adding appropriate changes.

For example, the above-described embodiment shows an example of obtaining an image of a sewn product by controlling the robot 2 to which the imaging device 3 is mounted. However, such a configuration may be possible that the robot 2 holds a sewn product and allows the seam of the sewn product to be imaged while changing the angle of the sewn product with respect to the imaging device 3 installed in the vicinity thereof.

Figure 5:
FIG. 5 is a diagram for explaining quality determination of a special seam.
Figure 5:
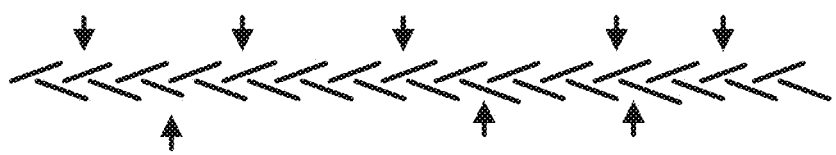
Figure 5:
Figure 5:
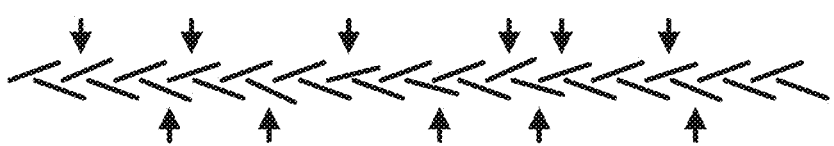

Further, as a seam, a seam of a complex shape as illustrated in FIG. 5 may be a target, for example, besides the one illustrated in FIG. 3. In that case, a feature quantity matching the shape of each seam may be used. For example, in the example of FIG. 5, for the seam of the upper row and the seam of the lower row, the length or angle of each of them may be extracted as a feature quantity, and a different threshold may be used for quality determination of each of the seam of the upper row and the seam of the lower row. Further, in the example of FIG. 5, it is possible to use angular difference variation or the like between the seam of the upper row and the seam of the lower row as a material for quality determination.

Besides those illustrated in FIG. 5, quality determination may be performed on stitches of cross-stitch used for embroidery or the like, for example. In the case of determining the quality of the stitches of cross-stitch, stitches applied to one flat area may be handled as a set of stitches, and quality determination may be performed on the set of stitches.

While the embodiments of the present invention have been described above, the present invention is not limited to the examples of the embodiments, and can be implemented in other aspects by adding appropriate changes.

The invention claimed is:

1. A seam inspection apparatus for determining quality of a seam of a sewn product, the apparatus comprising:
    an imaging device configured to acquire image data of the seam of the sewn product; and
    a processor configured to
        extract a feature quantity from a partial image which is a part of an entire image in the image data acquired by said imaging device, the entire image including a series of seams, and the partial image including a number of seams less than all of the seams in the entire image of the series of seams, and
        perform quality determination of the seam based on the feature quantity of the seam.

2. The seam inspection apparatus according to claim 1, wherein
    the feature quantity of the seam includes at least one of a length and an angle of the seam.

3. The seam inspection apparatus according to claim 1, wherein
    the feature quantity of the seam includes at least one of a width, an area, a color, and presence or absence of a fray of the seam.

4. The seam inspection apparatus according to claim 1, wherein
    the processor is configured to determine that the seam is defective when, regarding the feature quantity of each seam included in the series of seams, a number of seams having the feature quantity exceeding an allowable range is equal to or larger than a predetermined threshold.

5. The seam inspection apparatus according to claim 1, wherein
the processor is configured to determine that the seam is defective when, regarding the feature quantity of each seam included in the series of seams, a variance value of the feature quantity is equal to or larger than a predetermined threshold.

6. The seam inspection apparatus according to claim 1, wherein
the processor is configured to determine that the seam is defective when, regarding a difference in the feature quantity between adjacent seams in the series of seams, a number of sets of the seams in which the difference exceeds a predetermined threshold is equal to or larger than a predetermined threshold.

7. A seam inspection apparatus that determines quality of a seam of a sewn product, the apparatus comprising:
an image data acquisition unit that acquires image data of the seam of the sewn product;
a feature extraction unit that extracts a feature quantity of the seam from the image data of the seam of the sewn product acquired by the image data acquisition unit; and
a quality determination unit that performs quality determination of the seam based on the feature quantity of the seam, wherein
the quality determination unit is configured as a machine learning device in which supervised learning is performed by using a feature quantity of the seam of the sewn products and a quality result that is determined in advance for the sewn product as teacher data.

8. The seam inspection apparatus according to claim 7, wherein
the feature extraction unit extracts a partial image of the seam as a feature quantity from the image data of the seam of the sewn product.

9. A seam inspection apparatus for determining quality of a seam of a sewn product, the apparatus comprising:
an imaging device configured to acquire image data of the seam of the sewn product; and
a processor configured to
extract a feature quantity of the seam from the image data of the seam of the sewn product acquired by said imaging device, and
perform quality determination of the seam based on the feature quantity of the seam, wherein
the processor is configured to perform the quality determination on the basis of a result of a machine learning in which supervised learning is performed by using a feature quantity of the seam of the sewn products and a quality result that is determined in advance for the sewn product as teacher data.

10. The seam inspection apparatus according to claim 9, wherein
the feature quantity of the seam includes at least one of a length and an angle of the seam.

11. The seam inspection apparatus according to claim 9, wherein
the feature quantity of the seam includes at least one of a width, an area, a color, and presence or absence of a fray of the seam.

12. The seam inspection apparatus according to claim 9, wherein
the processor is configured to determine that the seam is defective when, regarding a feature quantity of each seam included in a series of seams, a number of the feature quantities exceeding an allowable range is equal to or larger than a predetermined threshold.

13. The seam inspection apparatus according to claim 9, wherein
the processor is configured to determine that the seam is defective when, regarding a feature quantity of each seam included in a series of seams, a variance value of the feature quantity is equal to or larger than a predetermined threshold.

14. The seam inspection apparatus according to claim 9, wherein
the processor is configured to determine that the seam is defective when, regarding a difference in feature quantity between adjacent seams in a series of seams, a number of sets of the seams in which the difference exceeds a predetermined threshold is equal to or larger than a predetermined threshold.

15. The seam inspection apparatus according to claim 9, wherein
the processor is further configured to extract a partial image of the seam as a feature quantity from the image data of the seam of the sewn product.

* * * * *